United States Patent
Allen et al.

(10) Patent No.: US 7,277,090 B2
(45) Date of Patent: Oct. 2, 2007

(54) METHOD AND APPARATUS FOR IMAGE AND VIDEO DISPLAY

(75) Inventors: William J. Allen, Corvallis, OR (US); John M. Da Cunha, Corvallis, OR (US); Paul H. McClelland, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 820 days.

(21) Appl. No.: 10/700,800

(22) Filed: Nov. 3, 2003

(65) Prior Publication Data

US 2004/0090396 A1 May 13, 2004

Related U.S. Application Data

(63) Continuation of application No. 10/020,112, filed on Dec. 14, 2001, now Pat. No. 6,680,579, which is a continuation-in-part of application No. 10/285,113, filed on Oct. 30, 2002, now Pat. No. 7,057,583, which is a continuation-in-part of application No. 10/120,945, filed on Apr. 10, 2002, now abandoned.

(51) Int. Cl.
*G09G 5/02* (2006.01)

(52) U.S. Cl. .................. 345/204; 345/3.3; 345/87; 345/88; 345/166; 348/781; 349/5; 349/8; 353/30; 353/34

(58) Field of Classification Search ............. 345/3.3, 345/22, 87, 88, 166, 204, 208; 348/780, 348/781; 349/5, 8; 353/30, 33, 34
See application file for complete search history.

(56) References Cited

U.S. PATENT DOCUMENTS

| | | | |
|---|---|---|---|
| 3,840,289 A | * | 10/1974 | Day .......................... 359/630 |
| 3,947,842 A | | 3/1976 | Hilsum et al. |
| 4,458,264 A | * | 7/1984 | Tamura ...................... 358/509 |
| 4,467,325 A | | 8/1984 | Lustig |
| 5,064,275 A | | 11/1991 | Tsunoda et al. |
| 5,153,761 A | | 10/1992 | Marlor |
| 5,396,304 A | | 3/1995 | Salerno et al. |
| 5,398,082 A | * | 3/1995 | Henderson et al. ......... 348/781 |
| 5,566,012 A | | 10/1996 | Koshimizu et al. |
| 5,612,798 A | | 3/1997 | Tuli |
| 5,784,038 A | * | 7/1998 | Irwin .......................... 345/88 |
| 5,914,480 A | * | 6/1999 | Swartz .................. 235/472.01 |
| 5,994,722 A | | 11/1999 | Averbeck et al. |
| 6,081,073 A | | 6/2000 | Salam et al. |
| 6,215,462 B1 | | 4/2001 | Yamada et al. |
| 6,229,531 B1 | * | 5/2001 | Nakajima et al. ........... 345/205 |

(Continued)

FOREIGN PATENT DOCUMENTS

EP 0547601 12/1991

(Continued)

*Primary Examiner*—Bipin Shalwala
*Assistant Examiner*—Vincent E. Kovalick

(57) ABSTRACT

The present invention relates to a display configured to display images that includes multiple display elements capable of controlling light within a visible-light spectrum. The display elements are arranged over a display surface of the display. The display also includes one or more receivers arranged with the display elements over the display surface of the display. The receivers are coupled with the display elements and receive transmitted image information. The receivers activate the display elements in response to, and in correspondence with, the image information.

28 Claims, 6 Drawing Sheets

U.S. PATENT DOCUMENTS

| | | |
|---|---|---|
| 6,320,325 B1 | 11/2001 | Cok et al. |
| 6,356,251 B1 | 3/2002 | Naito et al. |
| 6,375,874 B1 | 4/2002 | Russell et al. |
| 6,392,717 B1 | 5/2002 | Kunzman |
| 6,478,429 B1* | 11/2002 | Aritake et al. ............... 353/31 |
| 6,633,306 B1* | 10/2003 | Marz et al. ................. 345/698 |
| 6,900,798 B2* | 5/2005 | Heie ........................... 345/211 |
| 7,057,583 B2* | 6/2006 | Koll et al. ..................... 345/30 |
| 7,071,629 B2* | 7/2006 | Russ et al. ............... 315/169.3 |
| 2001/0040542 A1* | 11/2001 | Harada et al. ................ 345/87 |
| 2002/0001066 A1* | 1/2002 | Kobayashi ................... 353/31 |
| 2003/0067457 A1* | 4/2003 | Maeda ....................... 345/204 |
| 2003/0132901 A1* | 7/2003 | Shimada ...................... 345/87 |
| 2003/0156100 A1* | 8/2003 | Gettemy ..................... 345/204 |
| 2003/0189568 A1* | 10/2003 | Alkouh ....................... 345/422 |
| 2003/0214695 A1* | 11/2003 | Abramson et al. .......... 359/265 |
| 2004/0227827 A1* | 11/2004 | Loose ........................ 348/243 |

FOREIGN PATENT DOCUMENTS

| | | |
|---|---|---|
| EP | 0963121 | 12/1999 |
| FR | 2581228 | 4/1985 |
| GB | 1138820 | 11/1966 |
| GB | 2118803 | 4/1982 |
| JP | 01105989 | 4/1989 |

* cited by examiner

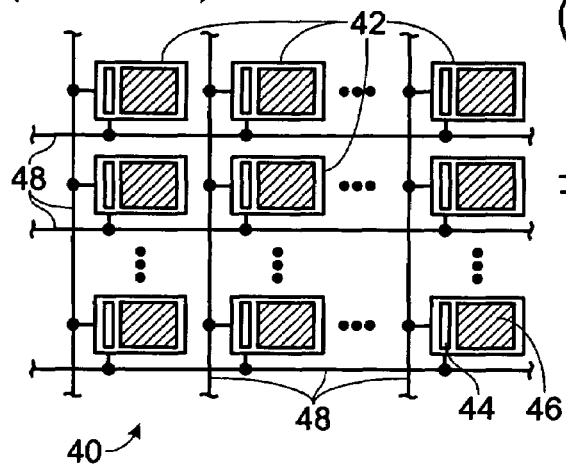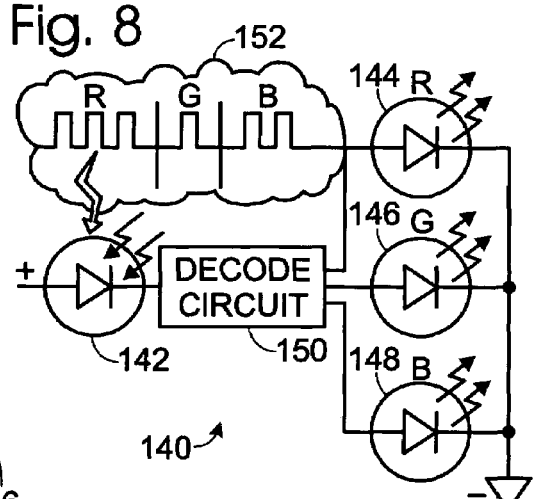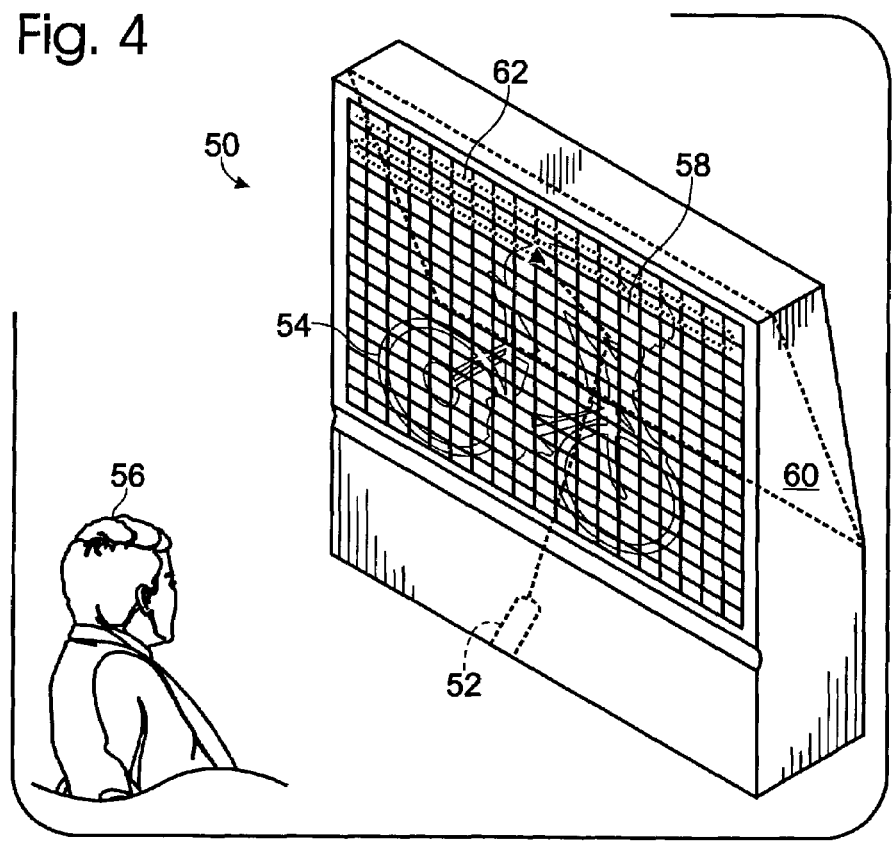

METHOD AND APPARATUS FOR IMAGE AND VIDEO DISPLAY

CROSS-REFERENCE TO RELATED APPLICATIONS

This is a continuation of application Ser. No. 10/020,112 filed on Dec. 14, 2001 now U.S. Pat. No. 6,680,579; a continuation-in-part of application Ser. No. 10/120,945, filed on Apr. 10, 2002 now abandoned; and a continuation-in-part of application Ser. No. 10/285,113, filed on Oct. 30, 2002 now U.S. Pat. No. 7,057,583, all of which are hereby incorporated by reference.

FIELD OF THE INVENTION

The present invention relates generally to displaying images and/or video (collectively "images") and, more particularly, to displaying images with optically-addressed, or broadcast-addressed displays.

BACKGROUND

Various techniques for displaying images, both still images and video images, exist. One such technique is the use of optical projection systems, which may employ either front or rear projection passive display screens. Other techniques may include active, liquid crystal display (LCD) projection devices or electrically-addressed, emissive displays (e.g., plasma flat panel displays). However, such techniques have drawbacks, such as reduced image quality and sequential color artifacts.

In this regard, increasing display size for projection systems may result in reduced image quality. Further, because projection systems generally employ passive screens, either reflective for front projection or diffusive for rear projection, all of the optical energy to display images with such systems is typically generated by the projector. For such systems, projection equipment capable of providing sufficient optical energy (visible-spectrum light) may be relatively expensive and may consume a significant amount of power in operation. Image quality for projection display systems may also suffer as a result of flicker and/or sequential color artifacts due to the use of a color wheel in combination with a "digital micromirror device" (which is a trademark of Texas Instruments, Inc.), for example. The effects on image quality resulting from sequential color artifacts may include rainbow-colored shadows that follow rapidly moving objects in video images.

Active LCD projection devices may also have certain disadvantages such as inefficient use of optical power as a result of polarizing visible-light before passing it through the LCD panels. Such polarizing is typically accomplished by employing known techniques, such as the use of a polarizing filter. Electrically addressed emissive displays have the further drawback of design complexity and, design and product cost associated with electrically addressing each pixel of such displays when displaying images. Thus, based on the foregoing, additional techniques for displaying images may be desirable.

SUMMARY OF THE INVENTION

The present invention relates to a display configured to display images that includes multiple display elements capable of controlling light within a visible-light spectrum. The display elements are arranged over a display surface of the display. The display also includes one or more receivers arranged with the display elements over the display surface. The receivers are coupled with the display elements and receive transmitted image information. The receivers activate the display elements in response to, and in correspondence with, the image information.

DESCRIPTION OF THE FIGURES

FIG. 3 is a schematic diagram of a prior art light valve matrix that may be employed with liquid crystal displays;

FIG. 4 is an isometric view of a rear projection display system according to an embodiment of the present invention;

FIG. 8 is a schematic diagram of another embodiment of an emissive display cell according to an embodiment of the present invention that may be included in the displays depicted in FIGS. 4 and 5;

DETAILED DESCRIPTION OF THE INVENTION

Figure 1:
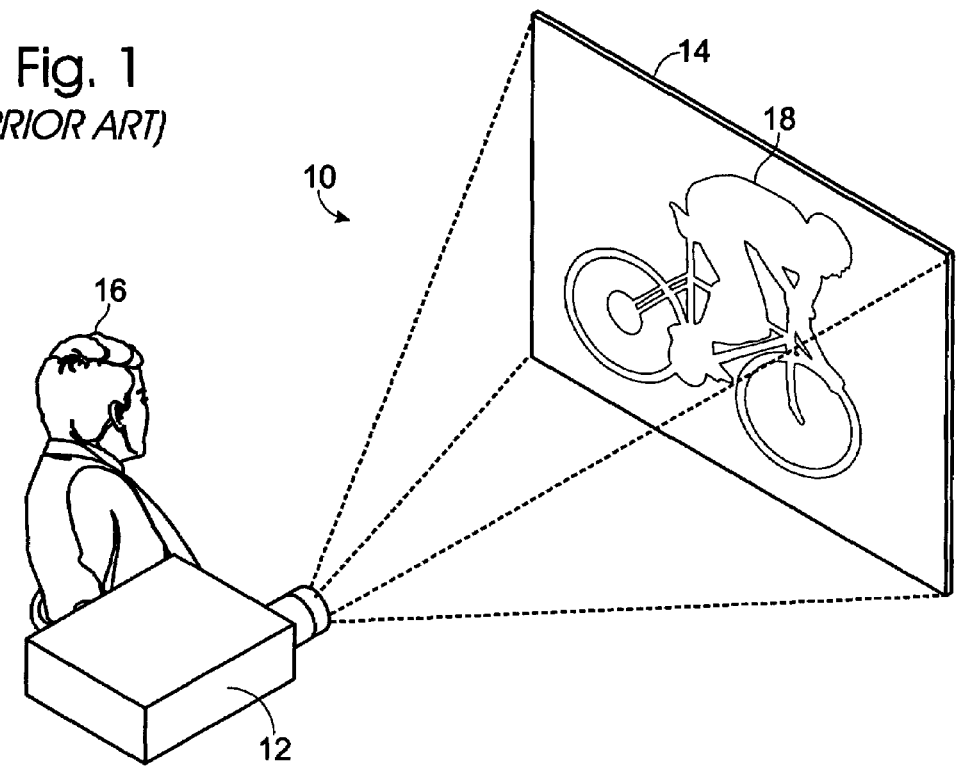
FIG. 1 is an isometric view of a prior art front projection display system using a reflective screen.
Figure 2:
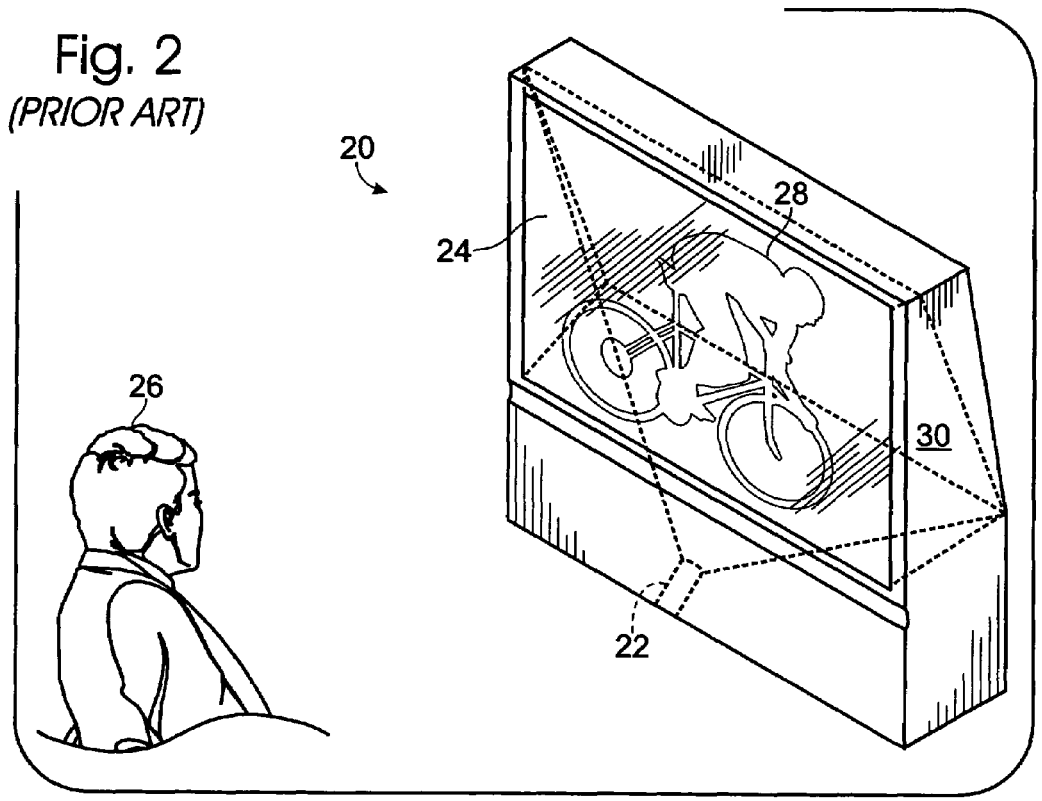
FIG. 2 is an isometric view of a prior art rear projection display system using a diffusive screen.

The present invention is directed to method and apparatus for displaying images. In this context, images may include still images or video images and, for consistency, will be referred to herein as images. FIGS. 1 and 2 illustrate prior art systems employing passive screens that may be used to display such images.

In FIG. 1, a prior art front projection display system is shown generally at 10. System 10 may include a projector 12 and a passive screen 14. In such a system, a viewer 16 is typically located on the same side of passive screen 14 as projector 12 when viewing images, such as image 18.

In system 10, optical energy including image 18 may be projected by projector 12 onto screen 14. Image 18 may then be reflected from screen 14 for viewing by viewer 16. In system 10, the optical energy to project image 18 onto screen 14 is provided by projector 12, and thus projector 12 may include a light source capable of generating thousands of lumens of optical energy, depending on the particular application. Such light sources are generally expensive, and may generate significant amounts of heat, for which cooling fans, and other design elements, would typically be employed to dissipate, adding further cost to projector 12. Cooling fans also may generate audible noise, which is undesirable. Employing such a light source may also be required to compensate for the effects of ambient light on the brightness and quality of image 18.

FIG. 2 illustrates a prior art rear projection display system shown generally at 20. System 20, in similar fashion to system 10, may include projector 22 and passive screen 24. However, in system 20, viewer 26 would typically be on the opposite side of passive screen 24 from projector 22, and image 28 would typically be projected onto the back of passive screen 24 via a mirror 30. In this situation, image 28 would typically be composed of optical energy that is diffused by passive screen 24. Because system 20 is self-contained, it may not be affected by surrounding light to the same extent as system 10. Nonetheless, projector 22 provides the optical energy employed to project image 28 and, therefore, typically employs a light source that is comparable with the light sources previously discussed with respect to FIG. 1. Also, the quality and brightness of image 28, when displayed using system 20, may be affected by the use of mirror 30. Use of mirror 30 may result in loss of optical energy and/or distortion of image 28.

FIG. 3 illustrates a prior art active liquid crystal display (LCD) matrix, indicated generally at 40. Display systems employing such an LCD matrix may be termed active displays, as matrix 40 may be actively addressed when displaying images. In this regard, matrix 40 may include a plurality of pixels 42. Each pixel 42 may further include control circuitry 44 and a light valve 46. Pixels 42 may be addressed, or accessed, via address lines 48. Matrix 40 may form a part of a transmissive display. Transmissive, in this context, means that light generated on one side of matrix 40 may be transmitted via pixels 42 to display an image.

Systems employing matrix 40, as with systems 10 and 20, have certain drawbacks. Because matrix 40 is transmissive, optical energy must be supplied via an independent, typically discrete, light source, as has been previously discussed. Such systems are known, and typically employ complex optics that may include dichroic mirrors, polarizers, spinning filter wheels, and/or multiple lenses. In some embodiments, optical/electronic devices, such as digital micromirror devices may be employed. Employing such optics and/or optical/electronics typically reduces the amount of light that is visible by a viewer of an image on such a display system because each optical stage results in some measurable optical energy loss. Such optical energy loss, often exceeding 80%, may adversely impact image brightness and/or image quality, such as image sharpness or color hue. Based on these drawbacks, and on the previously discussed disadvantages of systems 10 and 20, alternative techniques for displaying images may be desirable.

Referring now to FIG. 4, an embodiment of a rear projection display system according to the present invention is indicated generally at 50. Display system 50 includes a beam projector 52 and an optically-addressed screen 54. Screen 54 may take various forms, such as the embodiments discussed in further detail hereafter. Briefly, however, screen 54 is shown segmented, indicating an arrangement of display elements, as will be discussed below, which may cooperate with one another when displaying an image 58. The display elements of screen 54 may be emissive or transmissive, and the invention is not limited in scope to any particular display element. As with system 20, depicted in FIG. 2, viewer 56 would typically view images displayed using system 50 on an opposite side (front side) of emissive screen 54 from projector 52, which would typically be located behind, or on the backside of screen 54.

As is discussed in more detail below, screen 54 may include various types of receivers for receiving image information to be displayed. In the embodiment illustrated in FIG. 4, such receivers may be oriented so as to receive such image information on the backside of screen 54. In this respect, image 58 may be projected onto screen 54 via mirror 60. As will also be discussed further below, in certain embodiments, screen 54 may itself supply optical energy to display image 58 (emitting light within the visible-light spectrum). In such a situation, projector 52 would not be limited to projecting image 58 by employing visible-spectrum light and thus the energy emitted by projector 52 may be significantly less than the energy that would be employed if projector 52 supplied all the optical energy delivered to viewer 56. Furthermore, as is illustrated by beam path 62, projector 52 may raster, or repetitively scan, emissive screen 54 when displaying image 58, as opposed to projecting the entire image simultaneously.

Figure 5:
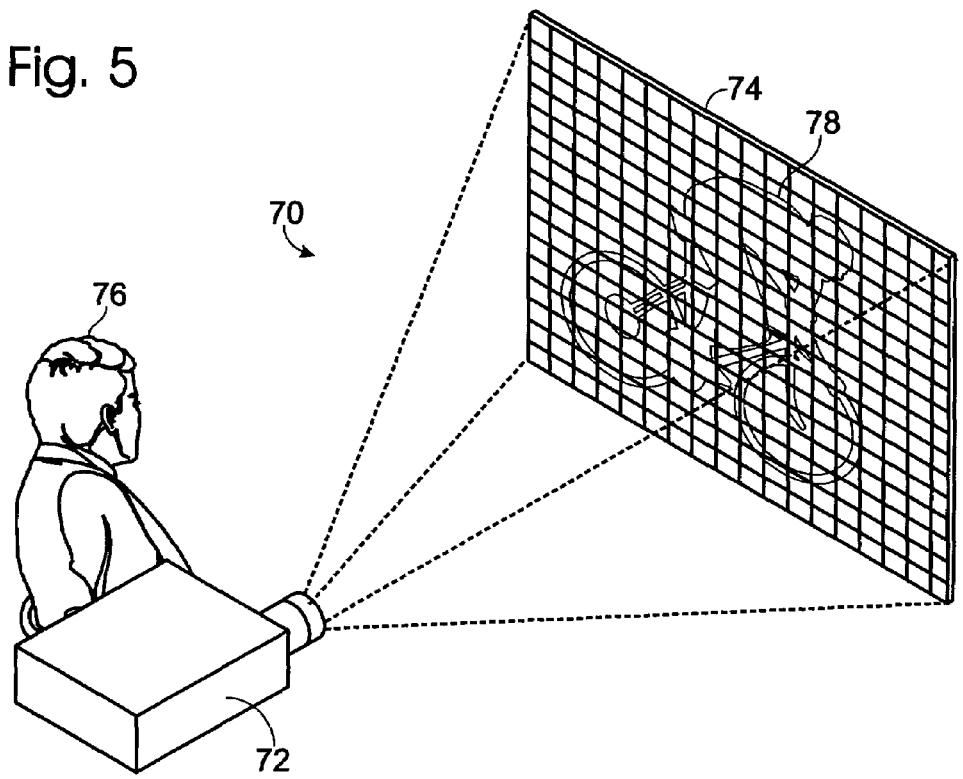
FIG. 5 is an isometric view of a front projection display system according to an embodiment of the present invention.

Referring to FIG. 5, a front projection display system according to the present invention is indicated generally at 70. Display system 70 includes projector 72 and screen 74, which may be substantially similar to screen 54, depicted in FIG. 4. A viewer 76 would typically be located on the same side of screen 74 as projector 72 when viewing images, such as image 78, displayed with display system 70.

In similar fashion to screen 54 of display system 50, depicted in FIG. 4, screen 74 may include various types of receivers for receiving image information to be displayed. In this embodiment, such receivers may be oriented so as to receive such image information on the front side (i.e. viewer side) of screen 74. Also, in similar respect as was discussed with regard to screen 54, certain embodiments of screen 74 may supply optical energy to display image 78 (emitting light within the visible-light spectrum). Thus, projector 72 is not limited to projecting image 78 by employing visible-spectrum light. Other techniques may be employed, and are discussed below.

As was indicated above, screen 54 and screen 74, depicted in FIGS. 4 and 5, respectively, may include an arrangement of display elements. Such display elements may be emissive, transmissive or reflective and would typically be capable of controlling colored light in the visible-light spectrum for displaying images. In this respect, referring to FIGS. 6 and 7, a schematic arrangement of a display according to the present invention is indicated generally at 80 in FIG. 6. A sub-arrangement of two adjacent emissive display cells according to an embodiment of the present invention is indicated generally at 100 in FIG. 7.

Figure 6:
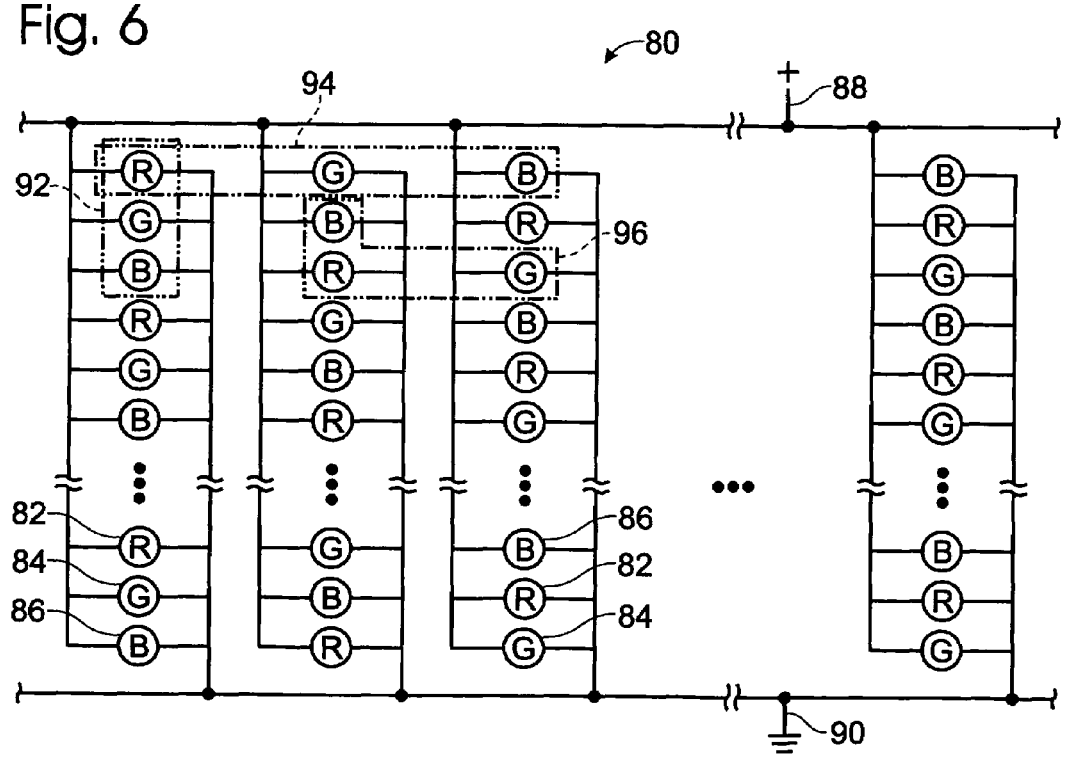
FIG. 6 is a schematic diagram of a portion of an optically-addressed display according to an embodiment of the present invention.

Referring now specifically to FIG. 6, for display 80, it will be appreciated that each display element may include a single emissive component or may include a plurality of discrete emissive components. These emissive components (and associated circuitry) may be implemented on a flexible circuit substrate, such as any number of polymer film substrates, which are known. In this respect, display 80 may include an arrangement of red emissive components 82, green emissive components 84 and blue emissive components 86, though the invention is not limited in scope in this respect and other combinations are possible, such as those discussed below. Such emissive components may be coupled with receivers for receiving image information, as will be discussed with respect to FIG. 7 below.

As can be seen in FIG. 6, red emissive components 82, green emissive components 84, and blue emissive components 86 may be arranged in a predetermined pattern, and may be coupled with a power supply connection 88 and a common ground 90 to provide electric power to the emissive components. This predetermined pattern may allow groups of emissive components 92, 94 and 96, for example, to cooperate in emitting colored light within the visible-light spectrum when displaying images. Such emissive components thus may supply optical energy, and would typically be arranged very close together over the surface of display 80 (on the order of micrometers in certain embodiments). Therefore, an arrangement such as that depicted in FIG. 6 may allow display of images with improved clarity and brightness as compared with prior art systems.

Figure 7:
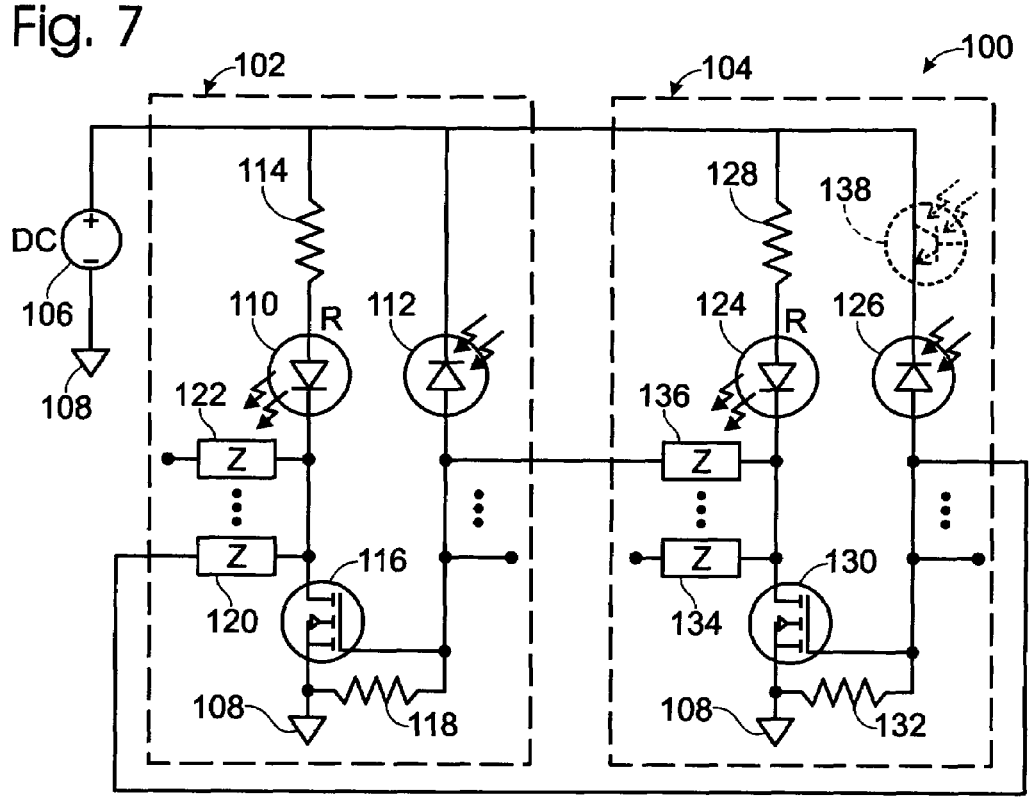
FIG. 7 is a more detailed schematic diagram of two emissive display cells according to an embodiment of the present invention that may be included in the displays depicted in FIGS. 4 and 5.

Referring now to FIG. 7, a pair of two emissive display cells according to the present invention is indicated generally at 100. Emissive display cell pair 100 may be included in a display, such as those discussed with regard to FIGS. 4-6. Emissive display cell pair 100 may include individual emissive display cells 102 and 104, both of which are red emissive display cells in the depicted embodiment. Of course, other combinations are possible and this particular arrangement is shown only by way of example. For example, groupings of various colors of emissive display cells may be used, and these groupings alternated over the display surface. In similar respect, as was discussed with respect to FIG. 6, emissive display cell pair 100 may be coupled with DC power supply 106 and common ground 108 to provide electric power to the various circuit and display elements of emissive display cell display pair 100.

As emissive display cells 102 and 104 operate in a similar manner, only the operation of emissive display cell 102 will be discussed in detail. In this respect, emissive display cell 102 may include a red emissive component, which, for this embodiment, takes the form of a red light-emitting diode (LED) 110, though alternative emissive components may exist. LED 110 may be coupled with transistor 116, resistor 118, impedances 120 through 122, and light-receiving diode (LRD) 112 (also known as a photodiode) via resistor 114. As depicted in FIG. 7, an indeterminate number of impedances, such as 120 and 122, may be included in emissive display cell 102. Likewise, emissive display cell 104 includes circuit elements 124-136, which correspond to those circuit elements discussed with respect to emissive display cell 102.

For the particular configuration of emissive display cells 102 and 104 depicted in FIG. 7, LRDs 112 and 126 may be infrared (IR) LRDs or visible-spectrum LRDs. Alternatively, phototransistors, such as phototransistor 138 (either IR or visible-spectrum), may be employed to receive image information. For such configurations, image information may be projected onto a display, such as those described above, using various frequencies of IR light or using low power visible-spectrum light. For embodiments employing various frequencies of IR light, LRD 112, or alternatively, phototransistor 138 may be adapted to receive IR light at a frequency corresponding with red portions of an image to be displayed. For the sake of simplicity, the further operation of emissive display cell 102 will be discussed with regard to employing LRD 112.

In operation, when IR light of the frequency corresponding to a red portion of an image is received at LRD 112, the LRD would begin to conduct current through resistor 118, which, in turn will apply voltage to the gate of transistor 116, causing it and LED 110 to conduct current. LED 110 will then emit red light. The amount of light, or intensity of red light, emitted from LED 110 over a given period of time may be controlled by modulating the duty cycle of IR pulses transmitted to LRD 112 over such a period of time associated with red portions of an image. Of course, other techniques for modulating the amount of light emitted exist, such as using the amplitude of the IR light projected to control the intensity of the red light emitted by LED 110. Similarly, emissive display cells containing green and/or blue emissive components may be employed, though other combinations of color bands are possible. Such cells would typically have receivers adapted to receive distinct IR light frequencies associated with their respective component colors (color bands), and may be controlled in similar fashion to that described with respect to emissive display cell 102. These green and blue emissive display cells, in cooperation with red emissive display cells, such as 102 and 104, may produce light of a range of colors within the visible-light spectrum.

Emissive display cells 102 and 104 may also further cooperate to improve the quality of an image displayed using image-sharpening techniques, which are discussed below. In this regard, emissive display cells 102 and 104 are coupled with each other via impedances 120 and 136. Looking again at emissive display cell 102, when transistor 116 is conducting current and LED 110 is emitting light, the gate of transistor 130 of emissive display cell 104 will be pulled electrically toward ground. This will result in it being more difficult to apply sufficient voltage to the gate of transistor 130 to allow LED 124 to conduct current and emit light. The advantage of such a configuration may be improved sharpness and quality of images displayed.

Referring now to FIG. 8, an alternative emissive display cell according to an embodiment of the present invention is indicated generally at 140. Emissive display cell 140 includes LRD 142, which may be coupled with red emissive component 144, green emissive component 146, and blue emissive component 148 via decode circuit 150. Numerous decode circuits are known, and the invention is not limited in scope to any particular implementation. It is noted that emissive display cell 140 may include associated circuitry (not shown) for controlling such a display cell, such as depicted in FIG. 7 for emissive display cells 102 and 104.

For the particular embodiment depicted in FIG. 8, image information 152 may be projected onto a display using IR light and received by LRD 142, as has been previously described. Projected image information 152 may be divided into segments corresponding to red (R), green (G) and blue (B), as is depicted in FIG. 8. When LRD 142 receives image information 152, it may then electrically communicate that information to decode circuit 150. Decode circuit 150, in turn, may then decode image information 152 to produce outputs to activate emissive components 144, 146 and 148 at specified intensity levels.

Figure 9:
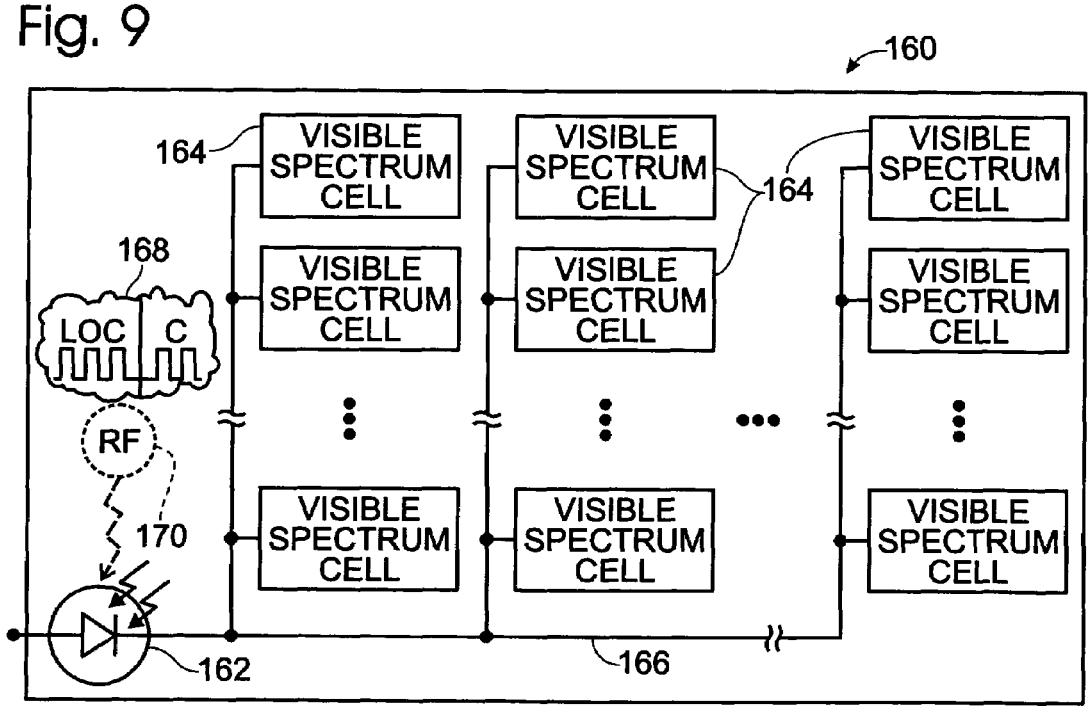
FIG. 9 is a schematic diagram of an optically-addressed display panel according to an embodiment of the present invention.

Referring now to FIG. 9, an embodiment of a display panel according to the present invention is indicated generally at 160. Again, for the sake of simplicity, some circuitry is not shown in this drawing. Display panel 160 may include LRD 162, which may be coupled with a plurality of visible-spectrum cells 164 via connector 166. Such visible-spectrum cells will be discussed in further detail with respect to FIG. 10. Briefly, visible-spectrum cells 164 may include circuitry that indicates each cell's location in panel 160. Image information 168 (defining an image to be displayed by panel 160) may be projected using IR light and received by LRD 162. Image information 168 may include location information (LOC) and color information (C), as is depicted in FIG. 9. Alternatively, image information 168 may be communicated to panel 160 in a radio-frequency (RF) signal, which may be received by an RF receiver 170. Image information received by LRD 162 or RF receiver 170 may then be electrically communicated to visible-spectrum cells for displaying an image associated with such information.

Figure 10:
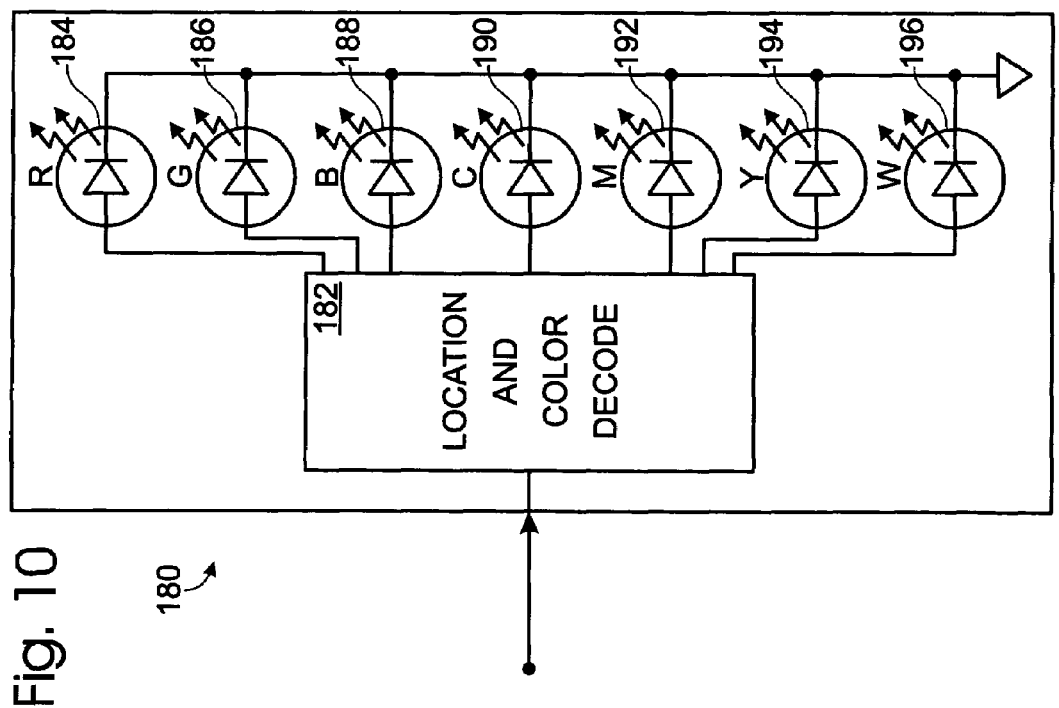
FIG. 10 is a schematic diagram of an embodiment of an emissive display cell that may be included in the display panel depicted in FIG. 9.

Referring now to FIG. 10, a visible-spectrum cell according to an embodiment of the present invention is indicated generally at 180. Visible-spectrum cell 180 may include location and color decode circuit 182, which may be coupled with red emissive component 184, green emissive component 186, blue emissive component 188, cyan emissive component 190, magenta emissive component 192, yellow emissive component 194 and white emissive component 196. For this particular embodiment, emissive components 184-196 take the form of LEDs, though alternatives may exist.

Electrically communicated image information may be received by location and color decode circuit 182 from a receiver, such as has been previously described. Such information would typically be transmitted sequentially for all visible-spectrum cells in display panel 160. Location and color decode circuit 182 may then convert location information (LOC) and color information (C) to specific address and intensity data for use in directing operation of display elements 184-196. Such image information may or may not directly specify an amount of optical energy to be emitted by emissive components 184-196. For example, in one embodiment, the image information may be encoded according to the CIELAB color standard, which is known. Color decode 182 may then convert the transmitted image information to correspond with the specific display elements employed by such a display system.

Figure 11:
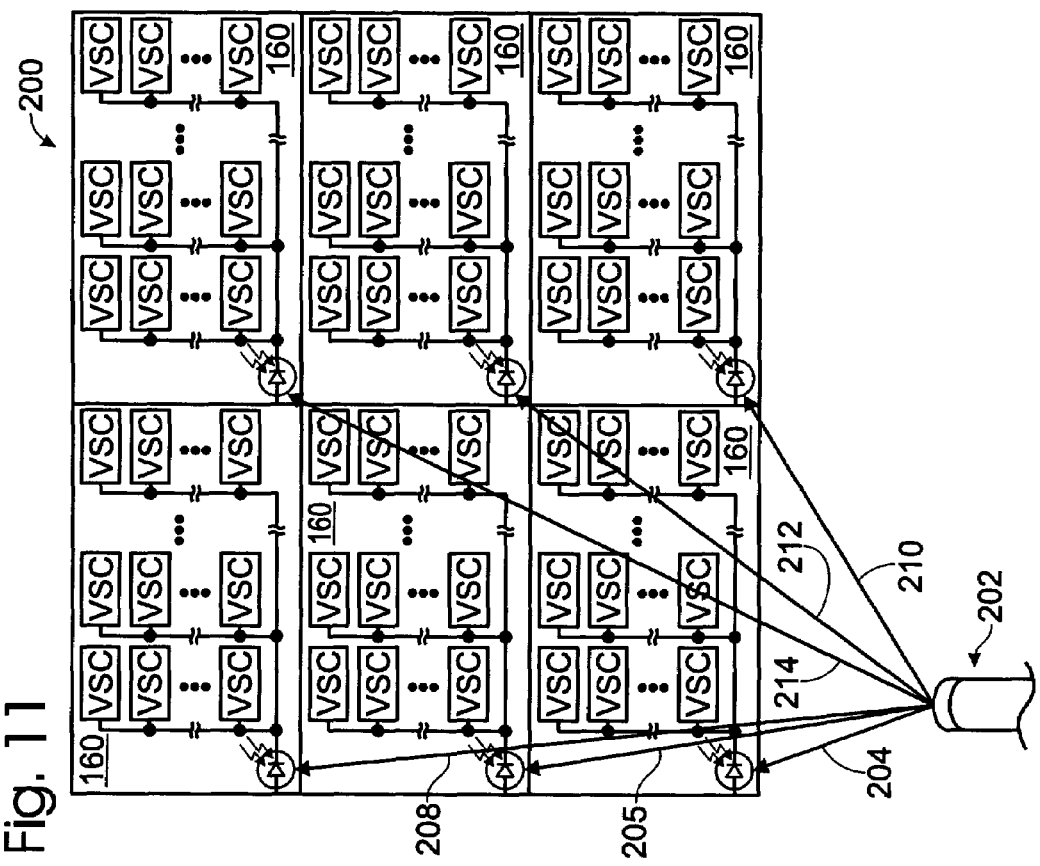
FIG. 11 is a schematic diagram illustrating an optically-addressed display according to an embodiment of the present invention including multiple display panels, as depicted in FIG. 9.

Referring now to FIG. 11, a display system employing a plurality of display panels 160 according to the present invention is indicated generally at 200. Display system 200 includes multi-beam projector 202. Because display system 200 includes a plurality of display panels 160, each having a single receiver, projection of image information for such a system may be simplified. In this regard, image information for each panel may be sent to that panel individually. This may be accomplished, for example, by using IR light beams 204, 206, 208, 210, 212 and 214. These beams may transmit image information sequentially to the panels 160, or the beams may transmit image information for each panel 160 in parallel. Alternatively, RF (such as 170) or ultra-violet (UV) (not shown) receivers may be used, and image information for display panels 160 may be transmitted to all display panels 160 sequentially. The specific technique employed will, of course, depend on the particular embodiment.

Figure 12:
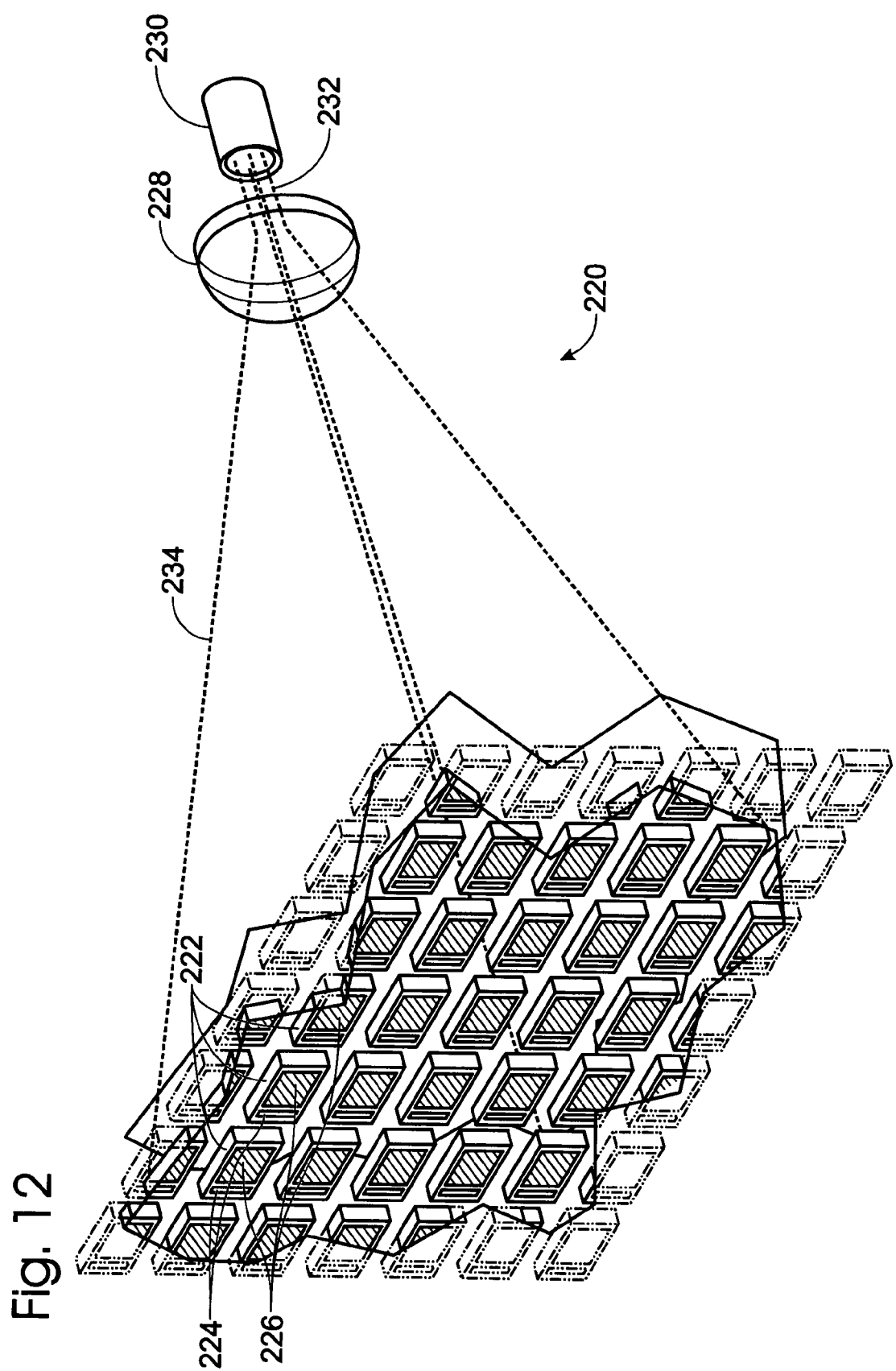
FIG. 12 is a fragmentary schematic diagram illustrating an optically-addressed, transmissive display according to an embodiment of the present invention.

Referring now to FIG. 12, a schematic diagram illustrating an optically-addressed, transmissive display according to an embodiment of the present invention is indicated generally at 220. Display 220 may include an arrangement of transmissive display cells 222. Transmissive display cells 222 may each include a receiver/decoder 224, which may be any of the previously described receivers and decoders, though the invention is not so limited. Transmissive display cells 222 may also include a display element in the form of a light valve 226, as has been previously described.

Display 220 may further include a polarizer 228, and a back light 230. Optical energy 232 generated by back light 230 may be polarized by polarizer 228, which may then result in polarized light 234 impinging on transmissive display cells 222. Image information (not shown), such as has been previously described, may be received by receiver/decoders 224. Receiver/decoders 224 may then generate signals to control light valves 226 in correspondence with the received image information to direct at least portions of polarized light 234 to a viewer to display images.

Alternatively, display cells 222 may take the form of reflective display cells configured to produce an optically-addressed, reflective display. Reflective display cells, it will be appreciated, also may each include a receiver/decoder 224, and a reflective display element 226. In this configuration, display elements 226 may act as reflective light modulators based on image information received by receivers/decoders 224. Furthermore, it will be appreciated that light 230 may be located on the same side of the display screen as a viewer when viewing the images, and that no polarizer need be employed. Receivers/decoders 224 thus may generate signals to control reflective display elements 226 in correspondence with the received image information to reflect at least portions of light 232.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A display comprising:
    a plurality of display elements capable of controlling light within a visible-light spectrum, the display elements being arranged over a display surface of the display; and
    a plurality of receivers arranged with the display elements over the display surface, the one or more receivers being coupled with the display elements and adapted to receive transmitted image information and activate the display elements in response to, and in correspondence with, the image information, wherein the receivers are oriented on the display to receive image information from a side of the display opposite of the display surface.

2. The display of claim 1, wherein the display elements include red, green and blue display components arranged so as to cooperate in producing light within the visible-light spectrum.

3. The display of claim 2, wherein the display elements further include at least one of cyan, magenta, yellow, white and black display components, arranged so as to cooperate in producing light within the visible-light spectrum.

4. The display of claim 1, wherein the display elements include emissive components capable of emitting light within the visible-light spectrum.

5. The display of claim 4, wherein the transmissive components are liquid crystal devices.

6. The display of claim 1, wherein the display elements include reflective components capable of reflecting light within the visible-light spectrum.

7. The display of claim 1, wherein the display elements include transmissive components configured to regulate transmission of light to the display surface in correspondence with the image information.

8. The display of claim 1, wherein the display elements and the receivers are disposed on a flexible substrate.

9. The display of claim 1, wherein the one or more receivers each include one or more infrared phototransistors.

10. The display of claim 1, wherein the one or more receivers each include one or more visible-spectrum light-receiving diodes.

11. The display of claim 1, wherein the one or more receivers include one or more visible-spectrum light phototransistors.

12. The display of claim 1, wherein the image information is received as light within the visible-light spectrum, and wherein color of the received light defines the image information.

13. The display of claim 1, wherein the image information is received as light within the visible-light spectrum, and wherein intensity of the received light defines the image information.

14. The display of claim 1, wherein the image information is defined by a received pattern of low-intensity visible light frequencies.

15. A display comprising:
a plurality of display elements capable of controlling light within a visible-light spectrum, the display elements being arranged over a display surface of the display; and
a plurality of receivers arranged with the display elements over the display surface, the one or more receivers being coupled with the display elements and adapted to receive transmitted image information and activate the display elements in response to, and in correspondence with, the image information, wherein the receivers each includes one or more infrared receiving diodes.

16. The display of claim 15, wherein the receivers each includes plural infrared receiving diodes corresponding, respectively, to at least a red emissive component, a green emissive component and a blue emissive component of the display elements.

17. The display of claim 15, wherein the image information is defined by a received pattern of a plurality of infrared frequencies.

18. A display system comprising:
an optically-addressed display including a plurality of display elements adapted to control light within a visible-light spectrum, and a plurality of receivers distributed over the display with the display elements and coupled with the display elements, the receivers being configured to optically receive image information; and
a projector configured to project the image information onto the display, wherein the projector optically addresses the plurality of display elements via the receivers.

19. The display system of claim 18, wherein the display elements each contain plural display components, each display component being associated with a receiver of the plurality of receivers, the plural display components being arranged so as to cooperate in producing light within the visible-light spectrum.

20. The display system of claim 18, wherein the projector is configured to contemporaneously project information of a complete image to be displayed.

21. The display system of claim 20, wherein the information of the complete image is projected using one of a plurality of infrared frequencies and pulse duty cycle modulated infrared light, and the receivers are infrared receivers configured to receive such infrared frequencies.

22. The display system of claim 20, wherein the information of the complete image is projected using low-intensity visible light and the receivers are visible-light receivers.

23. A method for displaying images comprising:
optically addressing a plurality of display cells distributed across a display surface by projecting image information associated with an image to be displayed, the display cells each including one or more receiver capable of optically receiving projected image information and one or more display element capable of controlling light within a visible-light spectrum;
receiving the image information on a surface of the display;
converting the image information into signals corresponding to colors and intensities associated with portions of the image to be displayed; and
displaying the image via the plurality of display elements.

24. The method of claim 23, wherein the image information is projected on a surface of the display that is opposite the display surface.

25. The method of claim 23, wherein receiving the image information includes receiving a low-intensity visible-spectrum light image.

26. The method of claim 23, wherein receiving the image information includes receiving infrared signals corresponding to visible-light colors and intensities of the image to be displayed.

27. A display comprising:
a plurality of display elements capable of controlling light within a visible-light spectrum, the display elements being distributed over a display surface of the display; and
a plurality of receivers distributed with the display elements over the display surface, the receivers being coupled with the display elements and adapted to receive transmitted image information and activate the display elements in response to, and in correspondence with, the image information, wherein a first display element is associated with a first receiver and a second display element is associated with a second receiver, the first display element being coupled with the second receiver and the second display element being coupled with the first receiver so as to affect a relative brightness of the first and second display elements with respect to each other.

28. A display system comprising:
an optically-addressed display including a plurality of display elements distributed over the display and adapted to control light within a visual light spectrum, and a plurality of visible-light receivers coupled with the display elements, the receivers being distributed over the display within the display elements and configured to optically receive image information; and
a projector configured to project the image onto the display, wherein the projector optically addresses the plurality of display elements via the receivers, the projector being configured to contemporaneously project information of a complete image to be displayed, and the image information being projected using low-intensity visible-light.

* * * * *